US011363060B2

(12) United States Patent
Fantham et al.

(10) Patent No.: US 11,363,060 B2
(45) Date of Patent: Jun. 14, 2022

(54) EMAIL SECURITY IN A MULTI-TENANT EMAIL SERVICE

(71) Applicant: MICROSOFT TECHNOLOGY LICENSING, LLC, Redmond, WA (US)

(72) Inventors: David William Fantham, Seattle, WA (US); Puneet Soti, Seattle, WA (US); Deepika Gakhar, Syosset, NY (US); Gregory Gourevitch, Redmond, WA (US); Abhishek Agrawal, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 420 days.

(21) Appl. No.: 16/662,325

(22) Filed: Oct. 24, 2019

(65) Prior Publication Data
US 2021/0126942 A1  Apr. 29, 2021

(51) Int. Cl.
*H04L 29/06* (2006.01)
*H04L 9/40* (2022.01)
(Continued)

(52) U.S. Cl.
CPC .......... *H04L 63/1466* (2013.01); *H04L 51/04* (2013.01); *H04L 51/28* (2013.01);
(Continued)

(58) Field of Classification Search
CPC ... H04L 63/1466; H04L 63/126; H04L 63/20; H04L 51/04; H04L 51/28; H04L 61/1511
(Continued)

(56) References Cited

U.S. PATENT DOCUMENTS 6,064,671 A * 5/2000 Killian ................ H04W 60/005
370/389
6,735,702 B1 * 5/2004 Yavatkar ............... G06F 21/554
713/190
(Continued)

FOREIGN PATENT DOCUMENTS

CA    2660288 A1 * 2/2007 .......... H04L 63/126
CN    1668013 A  *  9/2005
(Continued)

OTHER PUBLICATIONS

Mayer, Ruben, and Hans-Arno Jacobsen. "Scalable deep learning on distributed infrastructures: Challenges, techniques, and tools." ACM Computing Surveys (CSUR) 53, No. 1 (2020): 1-37. (Year: 2020).*

(Continued)

*Primary Examiner* — Harris C Wang
*Assistant Examiner* — Walter J Malinowski
(74) *Attorney, Agent, or Firm* — Shook, Hardy & Bacon, LLP

(57) ABSTRACT

The technology described herein helps improve email security within a multi-tenant email service. In particular, the technology described herein helps make it more difficult for a first tenant of the email service to impersonate a second tenant of the email service by validating the sending domain before the email leaves the multi-tenant email service. In particular, the technology runs a sending-side source validation on an email. If the source validation fails, the email is still sent, but using a source IP address that will cause the email to fail a receiving-side email authentication tests, such as the sender policy framework (SPF) email authentication test. In contrast, if the source validation passes, the email is sent using a source IP address that will cause the email to pass the receiving-side email authentication tests.

20 Claims, 6 Drawing Sheets

(51) Int. Cl.
  *H04L 51/04* (2022.01)
  *H04L 51/48* (2022.01)
  *H04L 61/4511* (2022.01)
(52) U.S. Cl.
  CPC ........ *H04L 61/1511* (2013.01); *H04L 63/126* (2013.01); *H04L 63/20* (2013.01)
(58) Field of Classification Search
  USPC .......................................................... 726/1
  See application file for complete search history.

(56) References Cited

U.S. PATENT DOCUMENTS

| | | | | |
|---|---|---|---|---|
| 8,484,749 | B2* | 7/2013 | McIsaac | H04L 63/14 |
| | | | | 726/28 |
| 8,549,081 | B2 | 10/2013 | Leiba et al. | |
| 8,560,616 | B1* | 10/2013 | Diac | H04L 51/28 |
| | | | | 709/206 |
| 8,713,306 | B1* | 4/2014 | Bennett | H04L 63/1491 |
| | | | | 713/154 |
| 8,879,504 | B2* | 11/2014 | Ng | H04L 12/4633 |
| | | | | 370/331 |
| 9,064,287 | B2 | 6/2015 | Mencke | |
| 10,158,677 | B1 | 12/2018 | DiCorpo et al. | |
| 10,212,188 | B2 | 2/2019 | Chasin et al. | |
| 10,326,735 | B2 | 6/2019 | Jakobsson et al. | |
| 10,609,074 | B2* | 3/2020 | Vissamsetty | H04L 12/4633 |
| 11,201,881 | B2* | 12/2021 | Janakiraman | H04L 63/101 |
| 11,212,238 | B2* | 12/2021 | Cidon | H04L 43/026 |
| 2003/0027551 | A1* | 2/2003 | Rockwell | B64D 11/00155 |
| | | | | 455/410 |
| 2005/0169274 | A1* | 8/2005 | Shuster | H04L 61/35 |
| | | | | 370/392 |
| 2006/0062214 | A1* | 3/2006 | Ng | H04W 36/0011 |
| | | | | 370/389 |
| 2006/0168057 | A1* | 7/2006 | Warren | H04L 51/12 |
| | | | | 709/206 |
| 2006/0168071 | A1* | 7/2006 | Sugiura | H04L 51/00 |
| | | | | 709/206 |
| 2006/0235930 | A1* | 10/2006 | Thurlow | H04L 63/0254 |
| | | | | 709/206 |
| 2008/0177994 | A1* | 7/2008 | Mayer | G06F 9/4418 |
| | | | | 713/2 |
| 2009/0080650 | A1* | 3/2009 | Selgas | H04L 9/0861 |
| | | | | 380/44 |
| 2010/0005146 | A1* | 1/2010 | Drako | G06Q 10/00 |
| | | | | 709/206 |
| 2010/0100930 | A1* | 4/2010 | King | H04L 63/1433 |
| | | | | 726/1 |
| 2011/0185085 | A1* | 7/2011 | Perkins | H04L 61/2514 |
| | | | | 709/245 |
| 2011/0289581 | A1* | 11/2011 | Gourevitch | H04L 51/12 |
| | | | | 726/14 |
| 2011/0314536 | A1* | 12/2011 | Kuckelman | H04L 63/1433 |
| | | | | 726/12 |
| 2012/0106554 | A1* | 5/2012 | Ng | H04L 12/4633 |
| | | | | 370/392 |
| 2013/0191892 | A1* | 7/2013 | Cadden | H04L 63/101 |
| | | | | 726/5 |
| 2013/0347116 | A1* | 12/2013 | Flores | H04L 63/1433 |
| | | | | 726/25 |
| 2014/0331318 | A1* | 11/2014 | Windsor | H04L 51/04 |
| | | | | 726/22 |
| 2014/0380405 | A1* | 12/2014 | Forsberg | H04W 12/35 |
| | | | | 726/1 |
| 2015/0373106 | A1 | 12/2015 | Dennis et al. | |
| 2016/0057167 | A1* | 2/2016 | Bach | H04L 51/18 |
| | | | | 726/23 |
| 2017/0032268 | A1* | 2/2017 | Rajagopalan | G06Q 10/00 |
| 2017/0034010 | A1* | 2/2017 | Fong | G06F 9/5072 |
| 2017/0237753 | A1* | 8/2017 | Manning Dawson | H04L 63/1416 |
| | | | | 726/23 |
| 2018/0176176 | A1* | 6/2018 | Kapur | H04L 67/10 |
| 2018/0234322 | A1* | 8/2018 | Cohn | H04L 41/12 |
| 2018/0260262 | A1* | 9/2018 | Mohammed | H04L 41/0654 |
| 2019/0068640 | A1* | 2/2019 | Araujo | G06F 21/54 |
| 2019/0103992 | A1* | 4/2019 | Cidon | H04L 61/255 |
| 2019/0199745 | A1 | 6/2019 | Jakobsson et al. | |
| 2019/0215335 | A1* | 7/2019 | Benishti | H04L 63/1441 |
| 2020/0351237 | A1* | 11/2020 | Chakkirala | H04L 61/1511 |
| 2020/0358652 | A1* | 11/2020 | Joyner | H04L 41/0889 |
| 2021/0092118 | A1* | 3/2021 | Zahed | H04L 63/08 |
| 2021/0320930 | A1* | 10/2021 | Dogu | H04L 63/126 |

FOREIGN PATENT DOCUMENTS

| | | | | |
|---|---|---|---|---|
| CN | 101321087 A | * | 12/2008 | |
| CN | 100553259 C | * | 10/2009 | |
| CN | 101626375 A | * | 1/2010 | |
| CN | 101635898 A | * | 1/2010 | ........... H04L 51/066 |
| CN | 103428177 A | * | 12/2013 | |
| CN | 105580333 A | * | 5/2016 | ........... G06F 21/554 |
| CN | 105828046 B | * | 2/2019 | |
| JP | 2003036243 A | * | 2/2003 | |
| JP | 2006067605 A | * | 3/2006 | |
| JP | 2006157621 A | * | 6/2006 | |
| RU | 105758 U1 | * | 6/2011 | |
| WO | WO-2006075323 A2 | * | 7/2006 | ....... H04L 29/12066 |
| WO | WO-2015007231 A | * | 1/2015 | ......... H04L 63/0236 |
| WO | WO-2015048921 A | * | 4/2015 | ............ H04W 36/08 |
| WO | WO-2016050990 A1 | * | 4/2016 | ........... H04W 12/37 |
| WO | 2016130339 A1 | | 8/2016 | |
| WO | WO-2016130339 A1 | * | 8/2016 | ........... H04L 61/304 |
| WO | 2019118838 A1 | | 6/2019 | |

OTHER PUBLICATIONS

Hameed, Sufian, Tobias Kloht, and Xiaoming Fu. "Identity based email sender authentication for spam mitigation." In Eighth International Conference on Digital Information Management (ICDIM 2013), pp. 14-19. IEEE, 2013. (Year: 2013).*

Li, Jie, Jun Bi, Jianping Wu, and Wei Zhang. "A Multi-fence Countermeasure Based Inter-domain Source Address Validation Method." In 2012 IEEE 11th International Symposium on Network Computing and Applications, pp. 259-262. IEEE, 2012. (Year: 2012).*

Kukec, A., M. Bagnulo, and M. Mikuc. "SEND-based source address validation for IPv6." In 2009 10th International Conference on Telecommunications, pp. 199-204. IEEE, 2009. (Year: 2009).*

Zhao, Guodong, Ke Xu, Lei Xu, and Bo Wu. "Detecting APT malware infections based on malicious DNS and traffic analysis." IEEE access 3 (2015): 1132-1142. (Year: 2015).*

"International Search Report & Written Opinion issued in PCT Application No. PCT/US2020/053446", dated Dec. 4, 2020, 24 Pages.

* cited by examiner

EMAIL SECURITY IN A MULTI-TENANT EMAIL SERVICE

CROSS REFERENCE TO RELATED APPLICATIONS

Background

A cloud computing platform can provide users with the ability to build, deploy, and manage services and applications in a distributed computing environment, i.e., the cloud. A tenant of a cloud computing platform need not provide or maintain their own infrastructure when the cloud computing platform is provided by a cloud service provider, allowing the tenant of the cloud computing platform to rapidly deploy services and applications. Some of the cloud computing platform's resources may be shared by tenants. For example, tenants in a multi-tenant email infrastructure may share IP addresses because the same servers provide services to multiple tenants. However, this may lead to abuse by some tenants of the cloud computing platform, such as sending unwanted or malicious email emails from the platform. Unwanted emails waste machine resources, such as inbox storage. Unwanted emails can be vectors for computer viruses to enter a computer and, thus, pose a security threat to computing devices.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein helps improve email security within a multi-tenant email service. In particular, the technology described herein helps make it more difficult for a first tenant of the email service to impersonate a second tenant of the email service by validating the sending domain before the email leaves the multi-tenant email service. In particular, the technology runs a sending-side source validation on an email. If the source validation fails, the email is still sent, but using a source IP address that will cause the email to fail a receiving-side email authentication tests, such as the sender policy framework (SPF) email authentication test. In contrast, if the source validation passes, the email is sent using a source IP address that will cause the email to pass the receiving-side email authentication tests.

Emails can be vectors for computer viruses that reduce computer efficiency. A serious virus, such as ransomware, can completely prevent a computer from operating by denying the computer access to its memory. Less serious viruses can siphon computer resources for unauthorized purposes, such as denial of service attacks. The invention described herein improves computer security by helping email systems identify unwanted email that may be virus vectors. The invention also frees up storage and user interface space by helping to prevent unwanted emails from getting to an email inbox.

BRIEF DESCRIPTION OF THE DRAWINGS

Aspects of the invention are described in detail below with reference to the attached drawing figures, wherein.

DETAILED DESCRIPTION

Figure 1:
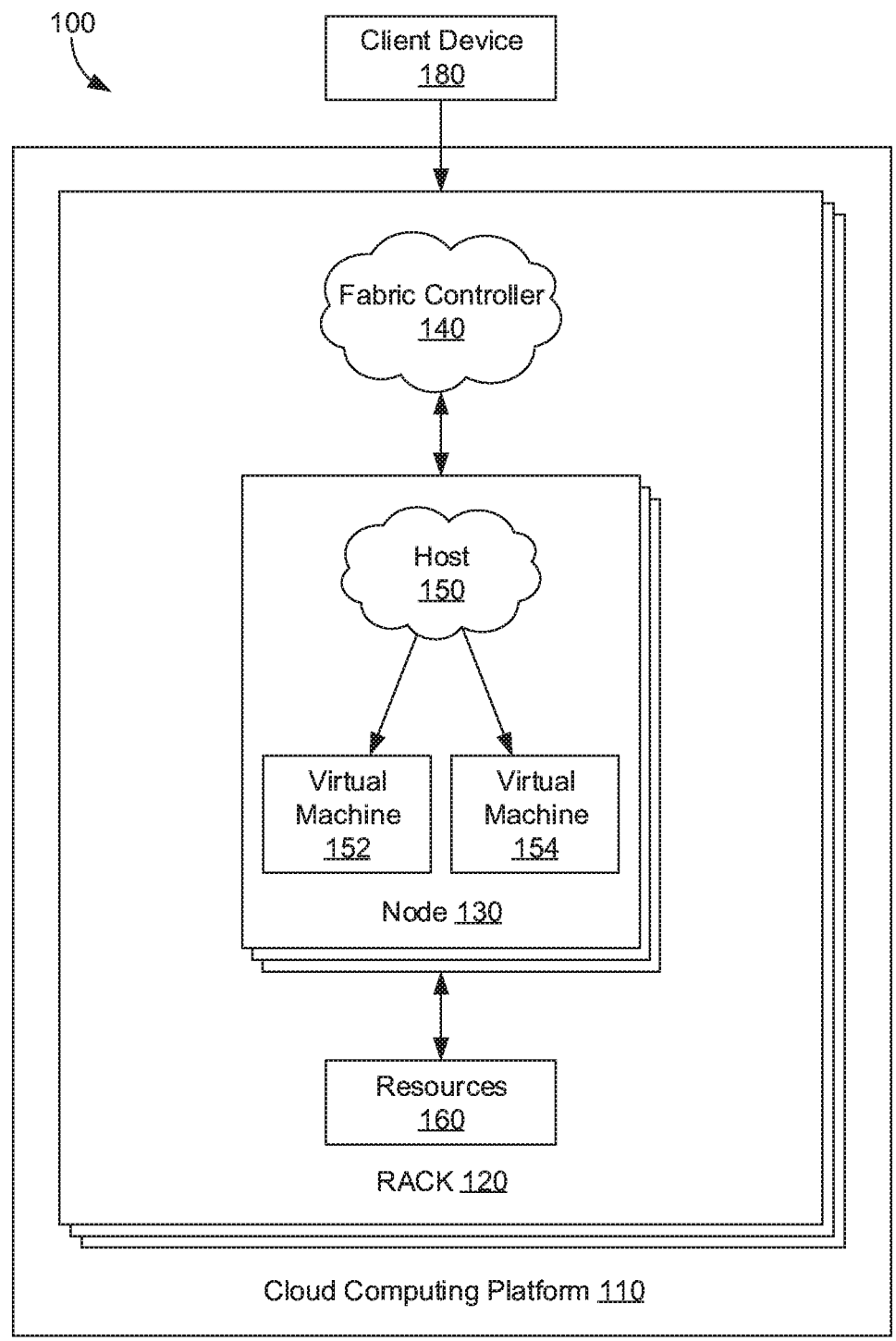
FIG. 1 is a block diagram of an example distributed computing environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein helps improve email security within a multi-tenant email service. In particular, the technology described herein helps make it more difficult for a first tenant of the email service to impersonate a second tenant of the email service by validating the sending domain before the email leaves the multi-tenant email service. In particular, the technology runs a sending-side source validation on an email. If the source validation fails, the email is still sent, but using a source IP address that will cause the email to fail receiving-side email authentication tests, such as the sender policy framework (SPF) email authentication test. In contrast, if the source validation passes, the email is sent using a source IP address that will cause the email to pass the receiving-side email authentication tests.

Emails can be vectors for computer viruses that reduce computer efficiency. A serious virus, such as ransomware, can completely prevent a computer from operating by denying the computer access to its memory. Less serious viruses can siphon computer resources for unauthorized purposes, such as denial of service attacks. The invention described herein improves computer security by helping email systems identify unwanted email that may be virus vectors. The invention also frees up storage and user interface space by helping to prevent unwanted emails from getting to an email inbox.

A multi-tenant email service allows multiple tenants (e.g., entities) to share cloud-based hardware and software resources. Each tenant may have a virtualized email service that is accessible only by the tenant. The virtualized email service may facilitate sending, receiving, and storing emails for the tenant. The emails may pass through common components of the cloud infrastructure, such as an output layer or mail transfer agent (MTA). The mail transfer agent can communicate emails outside of the cloud platform on behalf of many tenants. The MTA may use a pool of IP addresses across a group of tenants. For example, tenants using an email system in a single geographic location may share the same IP address pool. This pool of IP addresses may also be associated with the tenant's domains within Domain Name System (DNS) records.

The IP address-sharing arrangement can make it easier for one tenant to spoof another tenant's domain in a way that passes the sender policy framework (SPF) email authentication test. SPF authentication allows the receiving mail server to check that a received email claiming to come from a specific domain is sent from an IP address authorized by that domain's administrators. Failing the SPF authentication can cause the email to be classified as unwanted or malicious email (e.g., Spam, Phish, and Malware).

The Simple Mail Transfer Protocol (SMTP) permits any computer to send email claiming to be from any source address. Within SMTP, the source address may be designated in the "envelope-from" address field. SMTP does not impose restrictions on adding email addresses to the "envelope-from" address field. This flexibility is exploited by spammers who often use forged email addresses. The spammer can use any desired address in the "envelope-from" address field. As mentioned, the list of authorized sending hosts and IP addresses for a domain can be published in the DNS records for that domain. The SPF authentication method will detect when the sender's domain in the "envelope-from" address field does not match the sender's authorized IP addresses. Use of the SPF authentication means a spammer needs to spoof the "from envelope" address and send the email from a server with a sending IP address that is associated with the spoofed domain to pass an authentication test.

Tenants in a multi-tenant email system share IP addresses within both the system and DNS records. Without use of the technology described herein, the multi-tenant system will assign an IP address to any email leaving the system without reference to the "from envelope" domain. The technology described herein runs an internal source validation to make sure the tenant sending the email is associated with the domain in the "from envelope" field. If the tenant is not associated with the domain within a DNS record, then a source IP address that is not listed in any tenant's SPF DNS records is associated with the email. This will cause a mismatch between the domain and the IP addresses listed in the DNS record and cause the email to fail the SPF authentication.

Aspects of the technology described herein may refer to SMPT, SPF, and other protocols for the sake of a clear example. However, the technology described herein may be used in combination with other email protocols, in addition to those described herein. For example, the technology could work with the DomainKeys Identified Mail authentication test.

Example Distributed Computing Environment

FIG. 1 illustrates an example distributed computing environment 100 in which implementations of the present disclosure may be employed. In particular, FIG. 1 shows a high level architecture of an example cloud computing platform 110 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 100 that includes cloud computing platform 110, rack 120, and node 130 (e.g., computing devices, processing units, or blades) in rack 120. The technical solution environment can be implemented with cloud computing platform 110 that runs cloud services across different data centers and geographic regions. Cloud computing platform 110 can implement fabric controller component 140 for provisioning and managing resource allocation, deployment, upgrade, and management of cloud services. Typically, cloud computing platform 110 acts to store data or run service applications in a distributed manner. Cloud computing platform 110 in a data center can be configured to host and support operation of endpoints of a particular service application. Cloud computing platform 110 may be a public cloud, a private cloud, or a dedicated cloud.

Node 130 can be provisioned with host 150 (e.g., operating system or runtime environment) running a defined software stack on node 130. Node 130 can also be configured to perform specialized functionality (e.g., compute nodes or storage nodes) within cloud computing platform 110. Node 130 is allocated to run one or more portions of a service application of a tenant. A tenant can refer to a customer utilizing resources of cloud computing platform 110. Service application components of cloud computing platform 110 that support a particular tenant can be referred to as a tenant infrastructure or tenancy. The terms service application, application, or service are used interchangeably herein and broadly refer to any software, or portions of software, that run on top of, or access storage and compute device locations within, a data center.

When more than one separate service application is being supported by nodes 130, nodes 130 may be partitioned into virtual machines (e.g., virtual machine 152 and virtual machine 154). Physical machines can also concurrently run separate service applications. The virtual machines or physical machines can be configured as individualized computing environments that are supported by resources 160 (e.g., hardware resources and software resources) in cloud computing platform 110. It is contemplated that resources can be configured for specific service applications. Further, each service application may be divided into functional portions such that each functional portion is able to run on a separate virtual machine. In cloud computing platform 110, multiple servers may be used to run service applications and perform data storage operations in a cluster. In particular, the servers may perform data operations independently but exposed as a single device referred to as a cluster. Each server in the cluster can be implemented as a node.

Client device 180 may be linked to a service application in cloud computing platform 110. Client device 180 may be any type of computing device, which may correspond to computing device 600 described with reference to FIG. 6, for example, client device 180 can be configured to issue commands to cloud computing platform 110. In embodiments, client device 180 may communicate with service applications through a virtual Internet Protocol (IP) and load balancer or other means that direct communication requests to designated endpoints in cloud computing platform 110. The components of cloud computing platform 110 may communicate with each other over a network (not shown), which may include, without limitation, one or more local area networks (LANs) and/or wide area networks (WANs).

Figure 2:
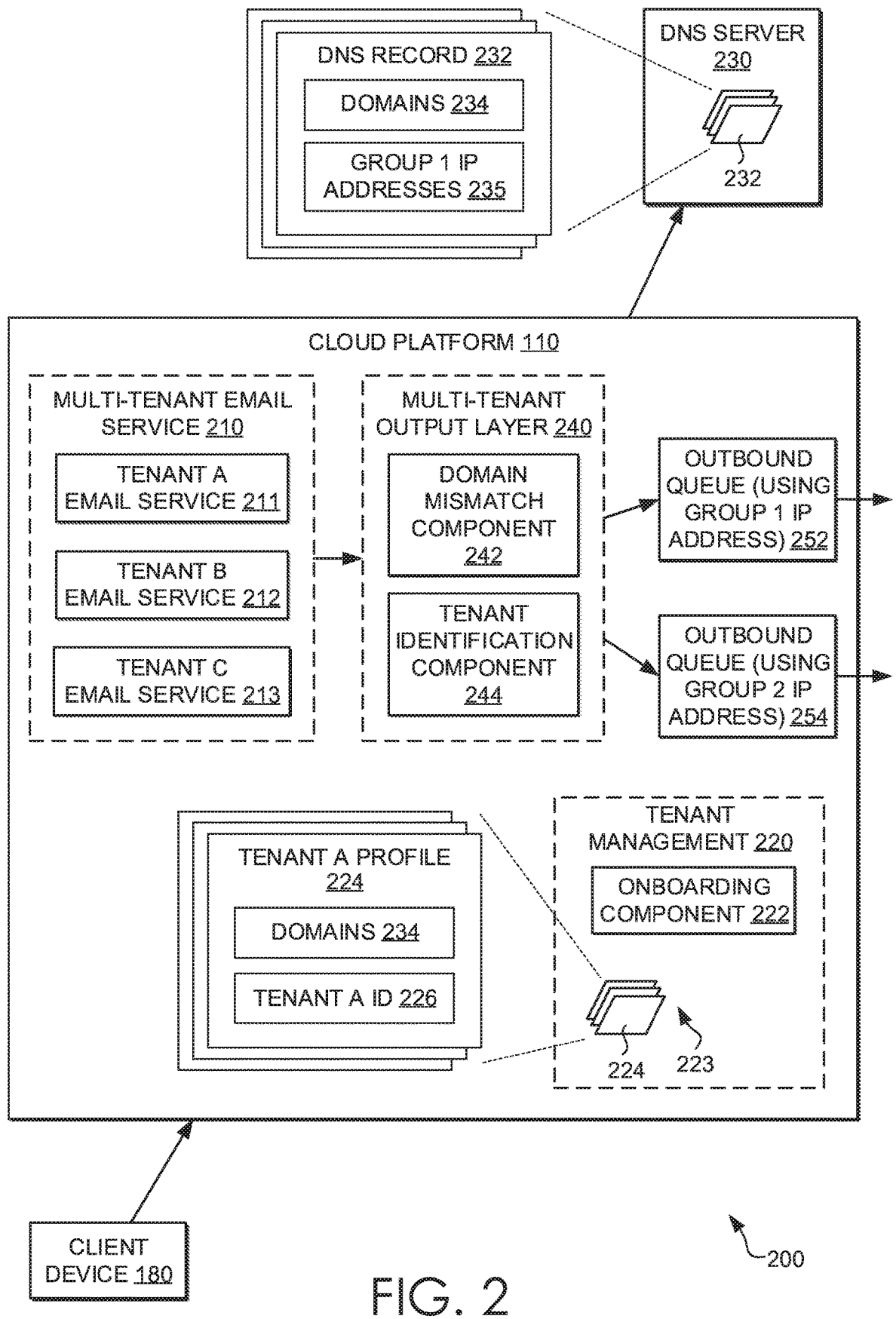
FIG. 2 is a diagram showing a multi-tenant email environment with IP address security, according to an aspect of the technology described herein.

FIG. 2 illustrates an exemplary multi-tenant email system, in accordance with an aspect of the present invention. Referring now to FIG. 2, with FIG. 1, a block diagram is provided showing aspects of an example computing system architecture suitable for implementing an aspect of the technology and designated generally as system 200. System 200 represents only one example of a suitable computing system architecture. Other arrangements and elements can be used in addition to or instead of those shown, and some elements may be omitted altogether for the sake of clarity. Further, as with distributed environment 100, many of the elements described herein are functional entities that may be implemented as discrete or distributed components or in conjunction with other components, and in any suitable combination and location.

Example system 200 includes cloud platform 110, which is described in connection to FIG. 1, and which hosts various components of system 200 including multi-tenant email service 210 (including its components 211, 212, and 213), tenant management component 220 (including its components 222 and 224), multi-tenant output layer 240 (including its components 242 and 244), outbound queue 252, and outbound queue 254. System 200 also includes DNS server 230, which may be coupled to the cloud platform 110 via a network, such as the Internet. These components may be embodied as a set of compiled computer instructions or functions, program modules, computer software services, or an arrangement of processes carried out on one or more computer systems, such as computing device 600 described in connection to FIG. 6, for example.

In one aspect, the functions performed by components of system 200 are associated with one or more personal assistant applications, services, or routines. In particular, such applications, services, or routines may operate on one or more user devices (such as client device 180), servers, may be distributed across one or more user devices and servers, or be implemented in the cloud. Moreover, in some aspects, these components of system 200 may be distributed across a network, including one or more servers and client devices, in the cloud, or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects, functionality of these components can be shared or distributed across other components.

Continuing with FIG. 2, the multi-tenant email service 210 includes three tenant email services, including tenant A email service 211, tenant B email service 212, and tenant C email service 213. Each of these email services share underlying hardware and software resources in order to provide an email service that allows a tenant to send emails, receive emails, and store emails, among other functions. Security is used so that a tenant only has access to its own email service. For example, the client device 180 may be allowed to access the tenant A email service 211 after providing a username and password. Each service can have a separate list of authorized users. Each service can also have its own customized policies for security, email handling, and the like.

The tenant management component 220 initiates tenant relationships with the cloud platform. The tenant management component 220 includes an onboarding component 222 and a tenant profile data store 223, which includes tenant A profile 224. The onboarding component 222 is responsible for authorizing new tenants of the multi-tenant email service 210. When a multi-tenant system first communicates with a new tenant, the system may perform a domain ownership validation of the new tenant. This may be done once when the new tenant signs up for service. As part of the onboarding process, the new tenant may demonstrate ownership of a domain by updating the DNS record 232 by adding a unique key to the domain's DNS record. The tenant management component 220 can then add those authorized domains 234 to the tenant profile 224. The new tenant can then configure the SPF DNS records to include the multi-tenant email service's IP addresses from Group 1. In this way, the domains 234 in the tenant A profile 224 will all be associated with the multi-tenant email service's IP addresses from Group 1 in the DNS record 232.

The tenant A profile 224 can also include tenant A ID information 226. This ID information can be used to identify messages received from the tenant through internal processes. Additional tenant profile attributes that are not shown may include a history of billing of the tenant, a tracked usage behavior of the tenant, a service model of the tenant, a code of the tenant infrastructure, a type of agreement between the tenant and a provider of the tenant infrastructure, an authentication of the tenant, or a combination thereof. For example, a history of billing can include the number of payments received, the number of delinquent payments, the method of payments, etc. Tracked usage behavior of a tenant can include tenant activities over a period of time, from which a cloud computing provider can indirectly or directly infer malicious activities by the tenant. It should be understood that the examples are meant to be illustrative rather than restrictive, and that other attributes may be contemplated.

The multi-tenant output layer 240 is responsible for transferring emails from a tenant email service to a recipient outside of the cloud platform 110. A group of tenant services use the same multi-tenant output layer 240. The multi-tenant output layer 240 can perform several functions during email transfer process including the assignment of a source IP address. In order to assign an IP address, the tenant identification component 244 determines which of the tenants originated the outbound email. Domains associated with that tenant, such as tenant A, are then retrieved from the tenant A profile 224. The sending domain of the outbound email is determined by the domain mismatch component 242 and compared with domains associated with the tenant's profile. If a mismatch is identified, meaning the email domain in an email field designating the sender does not match a domain in the tenant's profile, then the email is assigned an IP address that is not associated with the tenant's SPF DNS record or any other tenant's SPF DNS record. In the example of FIG. 2, an email from tenant A with a mismatched domain would not be assigned an IP address from group 1. Instead, the email would be assigned an IP address from a pool designated for use with mismatched sending domains. This difference is illustrated with the first outbound queue 252 and the second outbound queue 254

The first outbound queue 252 receives outbound messages that pass the domain mismatch test. In other words, the sending domain in the email matches a domain associated with the tenant that sent the email. These emails are assigned an IP address from the first group that is associated with the tenant in the tenant's DNS record.

The second outbound queue 254 receives outbound messages that fail the domain mismatch test. In other words, the sending domain in the email does not match a domain associated with the tenant that sent the email. These emails are assigned an IP address from the second group that is not associated with the tenant's SPF DNS record or any other tenant's SPF DNS record. In one aspect, IP addresses in the second group are not associated with any entity's DNS record.

DNS server 230 creates, stores, modifies, and accesses DNS records 232. The Domain Name System is a hierarchical distributed naming system for resources connected to networks, such as the Internet. The Domain Name System associates numerical IP addresses with domain names of network entities. DNS servers translate domain names, which can be easily remembered and used by humans, to numerical IP addresses. DNS servers can also store and provide other record types (such as Canonical Name (CNAME), free form text (TXT), mail exchanger record (MX record), and Pointer records (such as PTR records)) that do different functions. Both the SPF DNS record and domain ownership authentication process can involve changes to the TXT records.

The Domain Name System maintains the domain name hierarchy and provides translation services between it and the Internet Protocol (IP) address space. Internet name servers and a communication protocol implement the Domain Name System. A DNS name server is a server that stores the DNS records for a domain name, receives DNS requests, and responds with answers to queries against its database.

A tenant can update the DNS record 232 to add or remove IP addresses. The onboarding component 222 can send a query to the DNS server to confirm that the IP addresses in group 1 have been added to the profile.

Figure 3:
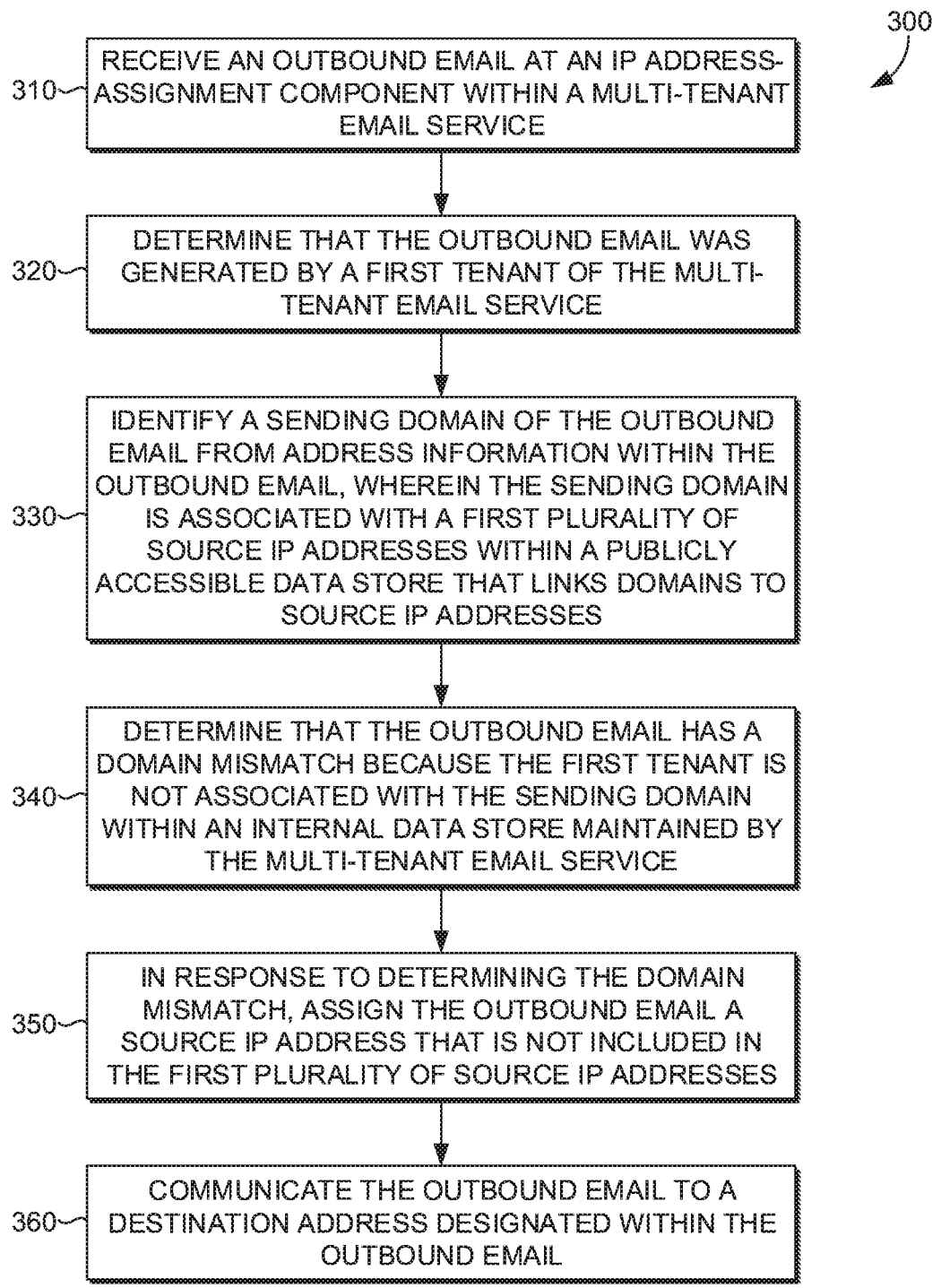
FIGS. 3-5 depict flow diagrams of methods for providing relevant search result content in an experience format that is optimized to the query, in accordance with an aspect of the technology.

Turning now to FIG. 3, a flowchart showing a method 300 for authenticating use of email domains within a multi-tenant email system is provided. Method 300 may be performed in a system similar to cloud platform 110, described previously.

At step 310, an outbound email is received at an IP address-assignment component within a multi-tenant email service. The IP address-assignment component may be similar to the multi-tenant output layer described previously. The IP address-assignment component receives an outbound message from an internal tenant and outputs the message to a recipient. As part of the process, the IP address-assignment component assigns an IP address to the outbound email based on whether a domain mismatch is identified, as described subsequently.

At step 320, the outbound email is determined to have been generated by a first tenant of the multi-tenant email service. Routing information received with the outbound email may be used to determine the tenant that originated the outbound email. The routing information is internal routing information within the multi-tenant email service. A lookup table of tenant profile information may be used to associate routing information with a particular tenant.

At step 330, a sending domain of the outbound email is determined from address information within the outbound email. For example, the sending domain could be the domain of an email address in the "from envelope" field of the email. The sending domain is associated with a first plurality of source IP addresses within a publicly accessible data store that links domains to source IP addresses. The publicly accessible data store may be a DNS server.

At step 340, the outbound email is determined to have a domain mismatch because the first tenant is not associated with the sending domain within an internal data store maintained by the multi-tenant email service.

At step 350, in response to determining the domain mismatch, the outbound email is assigning a source IP address that is not included in the first plurality of source IP addresses. As described previously, the use of this IP address will cause the email to fail the SPF authentication because the IP address on the email will not match an IP address associated with the domain in the DNS record.

If a domain mismatch were not found at step 340, then the outbound email would be assigned a source IP address that is included in the first plurality of source IP addresses.

Figure 4:
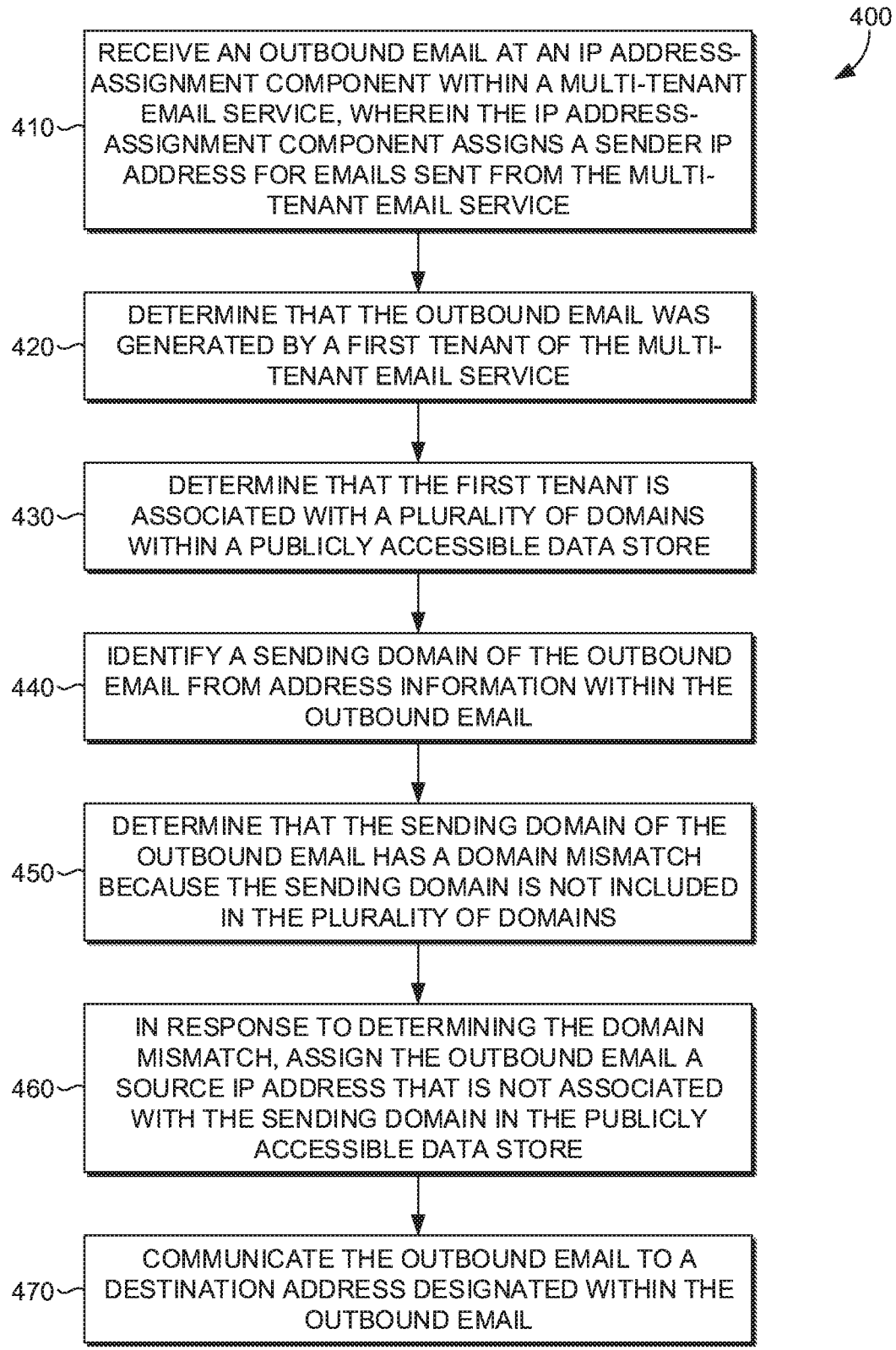

At step 360, the outbound email is communicated to a destination address designated within the outbound email Turning now to FIG. 4, a flowchart showing a method 400 for authenticating use of email domains within a multi-tenant email system is provided. Method 400 may be performed in a system similar to cloud platform 110, described previously.

At step 410, an outbound email is received at an IP address-assignment component within a multi-tenant email service. The IP address-assignment component may be similar to the multi-tenant output layer described previously. The IP address-assignment component receives an outbound message from an internal tenant and outputs the message to a recipient. As part of the process, the IP address-assignment component assigns an IP address to the outbound email based on whether a domain mismatch is identified, as described subsequently.

At step 420, the outbound email is determined to have been generated by a first tenant of the multi-tenant email service. Routing information received with the outbound email may be used to determine the tenant that originated the outbound email. The routing information is internal routing information within the multi-tenant email service. A lookup table of tenant profile information may be used to associate routing information with a particular tenant.

At step 430, the first tenant is determined to be associated with a plurality of domains within a publicly accessible data store. The publicly accessible data store may be a DNS server. The domains associated with the tenant may be tracked within a tenant profile maintained by the multi-tenant email service. The tenant may be asked to show control over the domains by modifying the DNS record for the domain, such as by adding a unique key to the TXT record.

At step 440, a sending domain of the outbound email is identified from address information within the outbound email. For example, the sending domain could be the domain of an email address in the "from envelope" field of the email.

At step 450, the sending domain of the outbound email is determined to have a domain mismatch because the sending domain is not included in the plurality of domains associated with the tenant who originated the outbound email. This indicates that the tenant may be trying to spoof a domain associated with a different entity.

At step 460, in response to determining the domain mismatch, the outbound email is assigned a source IP address that is not associated with the sending domain in the publicly accessible data store. As described previously, the use of this IP address will cause the email to fail the SPF authentication because the IP address on the email will not match an IP address associated with the domain in the DNS record.

If a domain mismatch were not found at step 450, then the outbound email would be assigned a source IP address that is associated with the sending domain in the publicly accessible data store.

Figure 5:
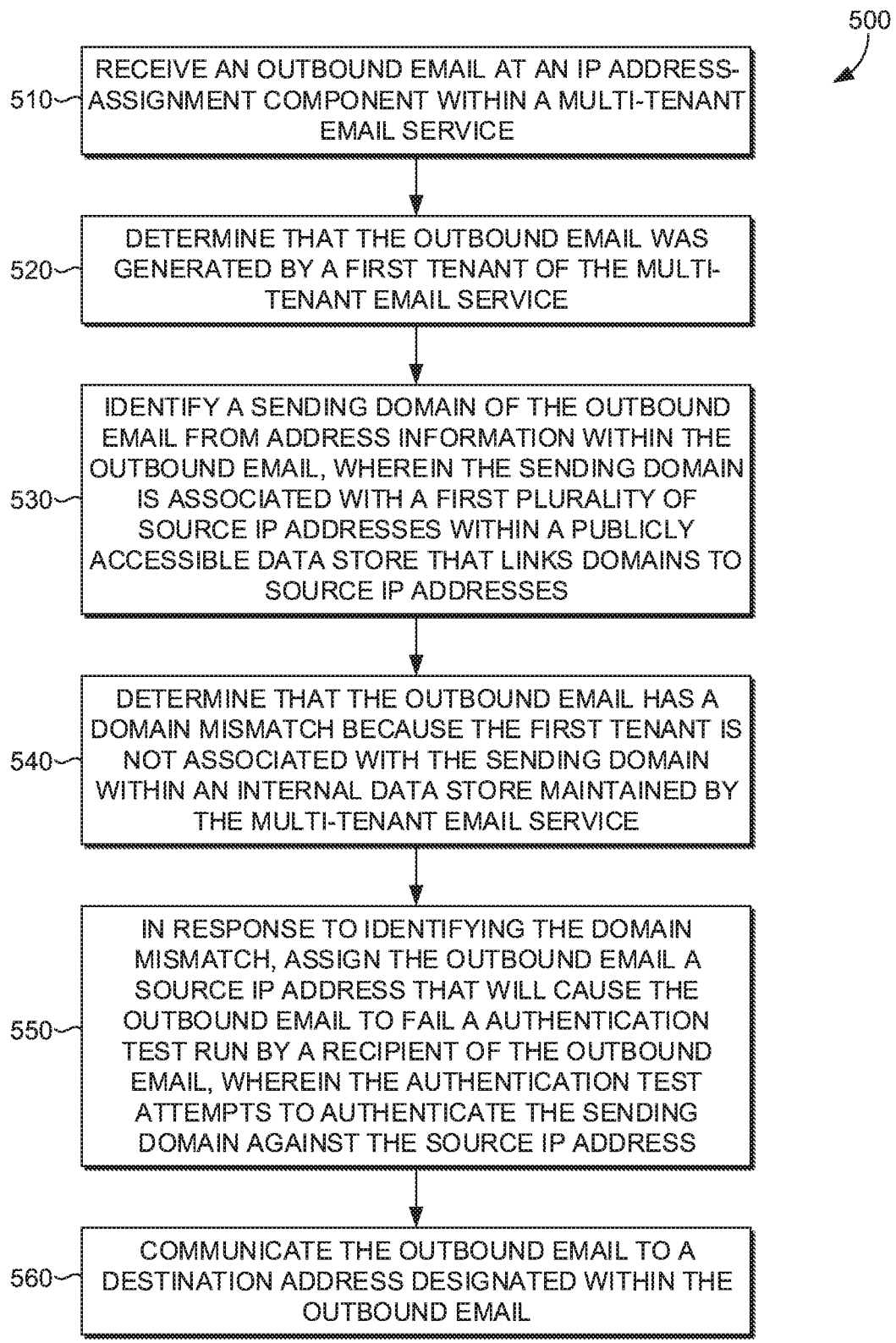

At step 470, the outbound email is communicated to a destination address designated within the outbound email Turning now to FIG. 5, a flowchart showing a method 500 for authenticating use of email domains within a multi-tenant email system is provided. Method 500 may be performed in a system similar to cloud platform 110, described previously.

At step 510, an outbound email is received at an IP address-assignment component within a multi-tenant email service. The IP address-assignment component may be similar to the multi-tenant output layer described previously. The IP address-assignment component receives an outbound message from an internal tenant and outputs the message to a recipient. As part of the process, the IP address-assignment component assigns an IP address to the outbound email based on whether a domain mismatch is identified, as described subsequently.

At step 520, the outbound email is determined to have been generated by a first tenant of the multi-tenant email service. Routing information received with the outbound email may be used to determine the tenant that originated the outbound email. The routing information is internal routing information within the multi-tenant email service. A lookup table of tenant profile information may be used to associate routing information with a particular tenant.

At step 530, a sending domain of the outbound email is identified from address information within the outbound email. For example, the sending domain could be the domain of an email address in the "from envelope" field of the email. The sending domain is associated with a first plurality of source IP addresses within a publicly accessible data store that links domains to source IP addresses.

At step 540, the outbound email is determined to have a domain mismatch because the first tenant is not associated with the sending domain within an internal data store maintained by the multi-tenant email service.

At step 550, in response to identifying the domain mismatch, the outbound email is assigned a source IP address that will cause the outbound email to fail an authentication test run by a recipient of the outbound email. The authentication test attempts to authenticate the sending domain against the source IP address. The authentication test could be SPF authentication. As described previously, the email will fail the SPF authentication when the IP address on the email does not match an IP address associated with the domain in the DNS record.

If a domain mismatch were not found at step 540, then the outbound email would be assigned a source IP address that will cause the outbound email to pass an authentication test run by a recipient of the outbound email.

At step 560, the outbound email is communicated to a destination address in the outbound email.

Figure 6:
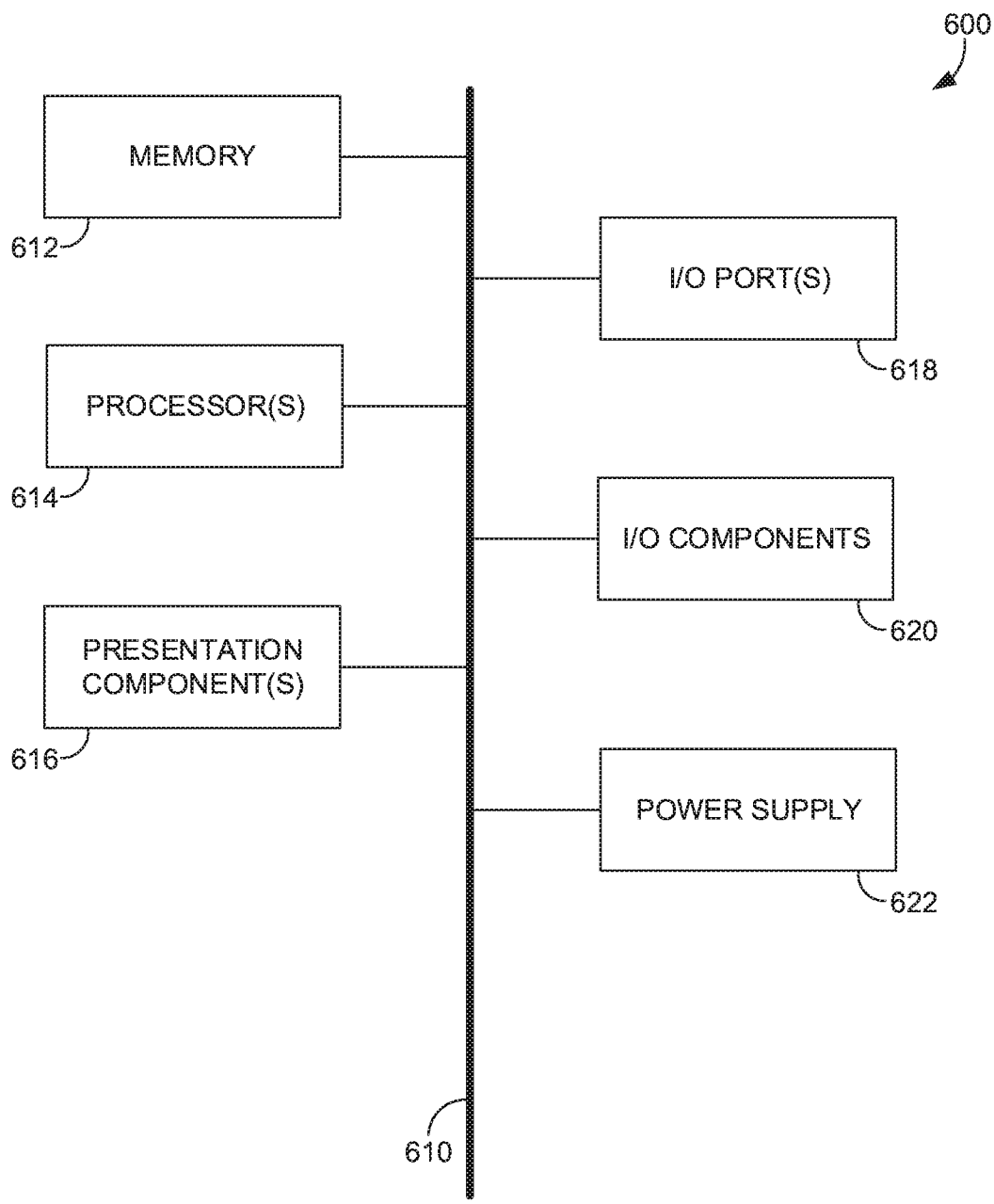
FIG. 6 is a block diagram of an exemplary computing environment suitable for use in implementing an aspect of the technology.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the present technology. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer-storage media and communication media.

Computer-storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc.

The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some aspects of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method for authenticating use of email domains within a multi-tenant email system, the method comprising:
   receiving an outbound email at an IP address-assignment component within a multi-tenant email service;
   determining that the outbound email was generated by a first tenant of the multi-tenant email service;
   identifying a sending domain of the outbound email from address information within the outbound email, wherein the sending domain is associated with a first plurality of source IP addresses within a publicly accessible data store that links domains to source IP addresses;
   determining that the outbound email has a domain mismatch because the first tenant is not associated with the sending domain within an internal data store maintained by the multi-tenant email service;
   in response to determining the domain mismatch, assigning the outbound email to a source IP address that is not included in the first plurality of source IP addresses; and
   communicating the outbound email to a destination address designated within the outbound email.

2. The method of claim 1, wherein the source IP address is taken from a second plurality of source IP addresses that is not associated with any tenant in the multi-tenant email service.

3. The method of claim 1, wherein multiple tenants of the multi-tenant email service are associated with the first plurality of source IP addresses within the publicly accessible data store.

4. The method of claim 1, wherein said assigning the outbound email to the source IP address that is not included in the first plurality of source IP addresses will cause the outbound email to fail an SPF authentication performed by a recipient of the outbound email.

5. The method of claim 1, wherein the sending domain is identified from a from envelope address of the outbound email.

6. The method of claim 1, wherein the sending domain is associated with a second tenant of the multi-tenant email service.

7. The method of claim 1, wherein the method further comprises determining that the first tenant is associated with a first domain by observing that the first tenant modified a record for the first domain within the publicly accessible data store.

8. A method for authenticating use of email domains within a multi-tenant email system comprising:
   receiving an outbound email at an IP address-assignment component within a multi-tenant email service, wherein the IP address-assignment component assigns a sender IP address for emails sent from the multi-tenant email service;
   determining that the outbound email was generated by a first tenant of the multi-tenant email service;
   determining that the first tenant is associated with a plurality of domains within a publicly accessible data store;
   identifying a sending domain of the outbound email from address information within the outbound email;
   determining that the sending domain of the outbound email has a domain mismatch because the sending domain is not included in the plurality of domains;
   in response to determining the domain mismatch, assigning the outbound email to a source IP address that is not associated with the sending domain in the publicly accessible data store; and
   communicating the outbound email to a destination address designated within the outbound email.

9. The method of claim 8, wherein multiple tenants of the multi-tenant email service are associated with a plurality of source IP addresses within the publicly accessible data store.

10. The method of claim 8, wherein the source IP address is taken from a plurality of source IP addresses that is not associated with any tenant in the multi-tenant email service.

11. The method of claim 8, wherein the method further comprising determining that the first tenant is associated with a first domain by observing that the first tenant modified a record for the first domain within the publicly accessible data store.

12. The method of claim 8, wherein identification of the plurality of domains associated with the first tenant is maintained in a tenant profile within the multi-tenant email service.

13. The method of claim 8, wherein the sending domain is identified from a from envelope address of the outbound email.

14. The method of claim 8, wherein the sending domain is associated with a second tenant of the multi-tenant email service.

15. The method of claim 8, wherein the publicly accessible data store is a DNS server.

16. One or more computer storage hardware media having computer executable instructions embodied thereon that, when executed by a computing device, causes the computing device to perform a method for authenticating use of email domains within a multi-tenant email system, the method comprising:
   receiving an outbound email at an IP address-assignment component within a multi-tenant email service;
   determining that the outbound email was generated by a first tenant of the multi-tenant email service;
   identifying a sending domain of the outbound email from address information within the outbound email, wherein the sending domain is associated with a first plurality of source IP addresses within a publicly accessible data store that links domains to source IP addresses;
   determining that the outbound email has a domain mismatch because the first tenant is not associated with the sending domain within an internal data store maintained by the multi-tenant email service;
   in response to identifying the domain mismatch, assigning the outbound email to a source IP address that will cause the outbound email to fail an authentication test run by a recipient of the outbound email, wherein the authentication test attempts to authenticate the sending domain against the source IP address; and
   communicating the outbound email to a destination address in the outbound email.

17. The media of claim 16, wherein the authentication test is an SPF authentication.

18. The media of claim 16, wherein the source IP address is not associated with any tenant in the multi-tenant email service.

19. The media of claim 16, wherein the publicly accessible data store is a DNS server.

20. The media of claim 16, wherein the sending domain is associated with a second tenant of the multi-tenant email service.

* * * * *